United States Patent [19]

Okada et al.

[11] Patent Number: 5,015,272
[45] Date of Patent: May 14, 1991

[54] ADSORPTIVE SEPARATION PROCESS

[75] Inventors: Hidetake Okada; Masato Kawai, both of Kawasaki; Shunji Enomoto; Taisuke Suzuki, both of Tokyo, all of Japan

[73] Assignee: Japan Oxygen Co., Ltd., Japan

[21] Appl. No.: 362,436

[22] PCT Filed: Sep. 14, 1988

[86] PCT No.: PCT/JP88/00929

§ 371 Date: May 16, 1989

§ 102(e) Date: May 16, 1989

[87] PCT Pub. No.: WO89/02309

PCT Pub. Date: Mar. 23, 1989

[30] Foreign Application Priority Data

Sep. 16, 1987 [JP] Japan .................. 62-231646

[51] Int. Cl.⁵ .................................................. B01D 53/04
[52] U.S. Cl. .......................................... 55/26; 55/62; 55/68; 55/75
[58] Field of Search ................. 55/25, 26, 33, 62, 68, 55/74, 75

[56] References Cited

U.S. PATENT DOCUMENTS

| | | | |
|---|---|---|---|
| 3,430,418 | 3/1969 | Wagner | 55/62 X |
| 3,564,816 | 2/1971 | Batta | 55/26 |
| 3,636,679 | 1/1972 | Batta | 55/62 X |
| 3,738,087 | 6/1973 | McCombs | 55/62 X |
| 4,026,680 | 5/1977 | Collins | 55/26 |
| 4,077,780 | 3/1978 | Dashi | 55/26 |
| 4,461,630 | 7/1984 | Cassidy et al. | 55/25 |
| 4,834,780 | 5/1989 | Benkmann | 55/26 |

FOREIGN PATENT DOCUMENTS

| | | |
|---|---|---|
| 0147277 | 7/1985 | European Pat. Off. ............ 55/25 |
| 2153807 | 1/1980 | Fed. Rep. of Germany . |
| 45-20082 | 7/1970 | Japan . |
| 51-40550 | 4/1976 | Japan . |
| 53-7315 | 3/1978 | Japan . |
| 55-12295 | 4/1980 | Japan . |
| 55-80702 | 6/1980 | Japan . |
| 1380579 | 1/1975 | United Kingdom . |

OTHER PUBLICATIONS

WO89/02309, 3/23/89, Okada et al.

Primary Examiner—Robert Spitzer
Attorney, Agent, or Firm—Lowe, Price, LeBlanc, Becker & Shur

[57] ABSTRACT

An adsorptive separation process of the present invention relates to a process for separating hydrogen and/or helium by a pressure swing adsorption process using four or more adsorbent beds. Each adsorbent bed manipulates the individual steps of adsorption, equal depressurization, cocurrent depressurization, countercurrent depressurization, purging, equal pressurization, product pressurization and raw gas pressurization while sequentially switching them and carries out the raw gas pressurization step for applying pressure with raw gas as the final step for pressuring the adsorbent bed to the adsorbent pressure. Accordingly, a variation in pressure and flow rate can be suppressed, product can be attained stably, and the amount of product can be increased.

4 Claims, 4 Drawing Sheets

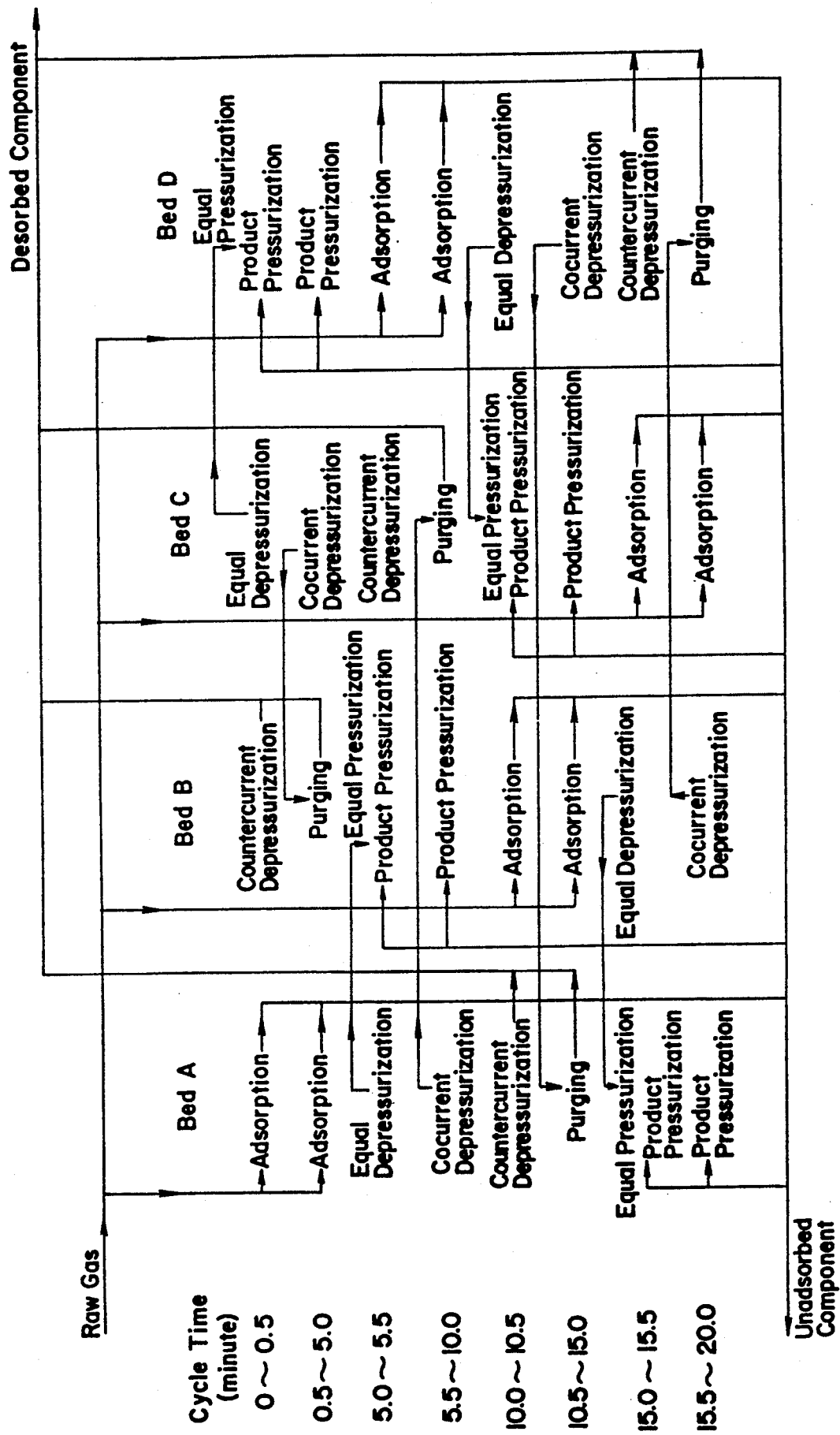

ADSORPTIVE SEPARATION PROCESS

TECHNICAL FIELD

The present invention relates to an adsorptive separation process for separating hydrogen and/or helium as high purity product gas, and, more particularly, to an adsorptive separation process for separating and refining gas by a pressure swing process for adsorptive separation.

BACKGROUND ART

The pressure swing adsorption process (hereinafter referred to as PSA process) is widely used as a gas separation and refining process, and is used in a variety of application fields, such as removal of water or carbonic acid gas from air or nitrogen gas, production of hydrogen from steam reforming gas, such as butane, naphtha or methanol, production of hydrogen from coal-based generated gas, such as COG, recovery of hydrogen from gas produced by oil refining, and recovery of helium from natural gas.

With the use of an adsorptive separation apparatus employing a PSA process, the essential factors from the view point of consumers of product gas are high purity and recovery rate of product and a small variation in product flow rate and pressure.

In general, according to the PSA process which separates an unadsorbed component as high purity product, for regeneration of an adsorbent, unadsorbed component gas or product gas is used to purge an easy adsorptive component gas. The most primitive process is to use product gas stored in a tank, as an unadsorbed component gas for this regeneration. In this case, however, since the product gas is used for regeneration, the recovery rate of the product gas significantly decreases, resulting in an increase in the cost of products. In addition, since part of product gas is used at the time that an adsorbent bed purged for regeneration of an adsorbent is repressurized, there arises a problem of causing a variation in flow rate and pressure of product gas to be sent to consumers.

As a solution to this problem, a selective adsorptive separation process is known which is disclosed in, for example, Japanese Patent Publication Nos. 45-20082 and 55-12295. According to the disclosed processes, in principle, four adsorbent beds are provided. High pressure unadsorbed component gas remaining in the first bed whose adsorption step has been completed is used to increase the pressure, by pressure equalization, in the second bed which has already been purged and purified under lower pressure (e.g., atmospheric pressure). Intermediate pressure unadsorbed component gas remaining in the first bed is expanded and then used to purge the third bed under the lowest pressure to thereby prevent loss of precious product gas and improve the recovery rate. High pressure product gas is constantly introduced to increase the pressure in the fourth bed which has been purified from intermediate pressure to high pressure. It is described that the above solves the problem of causing a variation in flow rate and pressure of the product gas.

FIG. 3 illustrates a flow sheet described in the aforementioned Japanese Patent Publication No. 45-20082, and FIG. 4 a time schedule for the process.

Although the notation is partially altered for the ease of comparison with the present invention, the same reference numerals are used for the same elements to facilitate the comparison with the publication. Although the cycle time is changed, it should be properly set depending on the size of adsorbent beds, the type of an adsorbent, the flow rate of each gas, etc. and is substantially the same as the procedure disclosed in the publication.

Four adsorbent beds A, B, C and D are arranged in parallel between a raw gas feed manifold 10 and a feed manifold 11 for product gas or unadsorbed component gas. Automatic valves 1A, 1B, 1C and 1D serve to feed the raw gas from the raw gas feed manifold 10 to the adsorbent beds A, B, C and D, respectively, and automatic valves 2A, 2B, 2C and 2D serve to feed product gas consisting of unadsorbed component gas from the respective adsorbent beds to the product gas feed manifold 11.

Easy adsorptive component gas adsorbed in the individual adsorbent beds is removed and discharged through countercurrent depressurization and purging steps via a waste gas manifold 12 from automatic valves 3A, 3B, 3C and 3D provided on the side of the raw gas inlet of each adsorbent bed.

A conduit 15 for connecting between product gas discharge ends of the adsorbent beds A and B, an automatic valve 4AB and a throttle valve 17 serve to execute pressure equalization between the adsorbent beds A and B. Similarly, a conduit 16 for connecting between product gas discharge ends of the adsorbent beds C and D, an automatic valve 4CD and a throttle valve 18 serve to execute pressure equalization between the adsorbent beds C and D. Automatic valves 5A, 5B, 5C and 5D are disposed to connect the product gas discharge ends of the individual adsorbent beds, and two of these valves are simultaneously opened so as to permit the passage of cocurrently depressurized gas from one adsorbent bed so the gas is used for purging another adsorbent bed.

This cocurrent depressurization is neither performed between the adsorbent beds A and B nor between the adsorbent beds C and D, but should be done through purging conduits 21 and 22. Throttle valves 19 and 20 provided at the purging conduits 21 and 22 serve to prevent an excessive flow rate, and pressure regulators 23 and 24 are set to keep those adsorbent beds which are performing cocurrent depressurization, at the minimum pressure. When the adsorbent beds reach this set pressure, the pressure regulators 23, 24 are closed, thus terminating the cocurrent depressurization and purging steps.

An automatic valve 26 for main waste discharge and throttle valve 25 are provided in parallel on the waste gas manifold 12, and restrict the amount of waste gas at the time of countercurrent depressurization. In a countercurrent depressurization step in which the pressure in the adsorbent beds has not reached down to the lowest pressure, the automatic valve 26 is closed and the waste gas is permitted to pass only through the throttle valve 25 to thereby control the flow rate or the depressurizing speed in the adsorbent beds. In a purging step in which the pressure in the adsorbent beds is at the lowest level, the automatic valve 26 is opened to minimize the flow resistance of the waste gas.

A repressurization conduit 27 provided with a flow regulator whose opening and closing are controlled by a flow controller FC connects the product gas feed manifold 11 and the product gas discharge ends of the individual adsorbent beds through automatic valves 6A, 6B, 6C and 6D respectively belong to the adsorbent beds. The automatic valves belonging to those adsorbent beds which are in the step of increasing the product gas pressure, are opened so that a constant flow rate of product gas in the feed manifold 11 is introduced in the adsorbent beds.

A description will now be given of the individual steps according to the time schedule shown in FIG. 4.

When the adsorbent bed A is in the adsorption step, the automatic valves 1A and 2A are opened to introduce the raw gas to the adsorbent bed A from the raw gas feed manifold 10. As it passes through the adsorbent bed A, easy adsorptive component gas is adsorbed by an adsorbent in the bed and the concentration of unadsorbed component gas gradually increases, thus providing high purity product gas at the product gas discharge end of the bed. This product gas is sent to the product gas feed manifold 11 from the automatic valve 2A. This adsorption step continues for 5 minutes.

When this adsorbent bed A is in the adsorption step, the first 0.5 minute of the adsorbent bed B is for the countercurrent depressurization step where the automatic valve 3B is opened so that gas existing under pressure of 5 ata in the bed is discharged through the throttle valve 25 to decrease the pressure in the bed to 1.1 ata. In this step, part of easy adsorptive component gas adsorbed is desorbed and discharged. Upon elapse of 0.5 minute, the automatic valves 5B, 5C are opened, and after equal depressurization step, gas existing at 9 ata in the adsorbent bed C is expanded to 1.1 ata through the flow regulator 24 and the throttle valve 20. This gas then flows through the adsorbent bed B, accompanied with further desorbed easy adsorptive component gas adsorbed in the bed, and is discharged out from the system through the automatic valve 3B and newly opened automatic valve 26. During this period, the adsorbent bed B is in the purging step and the adsorbent bed C is in the cocurrent depressurization step. This status continues for 4.5 minutes.

The adsorbent bed C is in the equal depressurization step for the first 0.5 minute, and the pressure in the bed which has been 16 ata at the end of the adsorption step is equalized with the pressure of 1.1 ata in the adsorbent bed D so that both become 9 ata. This equalization is carried out by opening the automatic valve 4CD to cause the throttle valve 18 to adjust the flow rate to the proper level For the subsequent 4.5 minutes, the aforementioned cocurrent depressurization step is performed, and the automatic valve 4CD is closed and the automatic valve 5C is opened.

The adsorbent bed D, for the first 0.5 minute, is in the equal pressurization step where its pressure is equalized with that of the adsorbent bed C as described earlier; during the same period, the automatic valve 6D is opened at the same time to permit product gas from the product gas feed manifold 11 to flow through the conduit 27 and flow regulator 28 to be introduced into the adsorbent bed D. Upon elapse of 0.5 minute, although the equalization is completed and the automatic valve 4CD is closed, the automatic valve 6D remains open so that the pressure in the adsorbent bed D is increased by the product gas from 9 ata to 16 ata. This state continues for 4.5 minutes and the pressurization of the adsorbent bed D is completed.

The above describes the gas flow and pressure change at the individual sections in one cycle time of 5 minutes. Upon elapse of 5 minutes., the adsorbent bed D which has already completed the pressurization enters the adsorption step, and the steps of the individual adsorbent beds are changed as indicated in the time schedule shown in FIG. 4; after 4 cycles (20 minutes), the individual adsorbent beds complete the entire steps and then repeat the procedure again.

The aforementioned Patent Publication No. 45-20082 describes that the recovery rate of product gas can be improved and a variation in flow rate and pressure of the product gas can be reduced by constituting the pressure swing adsorption apparatus in the above manner and executing the individual steps according to the mentioned time schedule.

The reasons for the above are given in the Patent Publication No. 45-20082 as follows.

In the case where the adsorbent bed A is in the adsorption step, for example, the unadsorbed component gas of the adsorbent bed C under high pressure is moved to the adsorbent bed D which is under the lowest pressure until the former pressure becomes intermediate pressure through pressure equalization to the pressure of the adsorbent bed D. The unadsorbed component gas still remaining in the adsorbent bed C is sent to the adsorbent bed B for purging this bed B for regeneration. The reason why the recovery rate of the product gas can be improved is that precious product gas is not used for purging for a regeneration purpose.

The adsorbent bed D then has intermediate pressure through the aforementioned pressure equalization to the pressure of the adsorbent bed C. To increase the pressure to a higher level, product gas is introduced through the conduit 27 and flow regulator 28 to the adsorbent bed D. It is described that since this flow regulator 28 always permits the flow of a constant amount of product gas, it does not vary the flow rate and pressure of product gas sent to consumers.

However, the above process still has the following shortcomings.

First of all, since a significant amount of product gas is required to increase the pressure in the adsorbent bed D to high pressure from intermediate pressure, the improvement of the recovery rate is limited. Although, in the Patent Publication No. 45-20082, two stages of pressure equalization step are used to increase the intermediate pressure at the time of equalization to thereby prevent loss of product gas, the two-staged pressure equalization requires a longer cycle time so that the necessary amount of adsorbent increases, thus affecting the sizes of the adsorbent beds or the overall apparatus, etc.

Secondly, introduction of product gas through the flow regulator 28 is said to continue until the pressure in adsorbent bed D is repressurized approximately to the product gas pressure. Since this flow regulator 28 serves to control the flow rate at a constant level, however, the opening of the flow regulator 28 becomes greater as the pressure in the adsorbent bed D gradually increases from the intermediate pressure, i.e., the difference between both pressures becomes smaller. And upon completion of the repressurization, the flow regulator seems to be fully opened. The rate of the flow through this flow regulator 28 is controlled at a constant level and in such a way that the pressurization of the adsorbent bed is completed within one cycle time (in which one adsorbent bed is in the adsorption step); however, this is in practice hardly possible. This is because that according to the PSA process, when the demanded amount of product gas is changed, the amount of raw gas to be supplied is changed accordingly, i.e, that a so called operational load control is executed in a wide range. This control is basically carried out by changing the cycle time; when the load is increased, the amount of supply of the raw gas is increased to shorten the cycle time while with a decrease in load, the amount of supply of the raw gas is decreased to elongate the cycle time, thus varying the amount of gas per unit time.

Since the aforementioned repressurization of an adsorbent bed should be completed within a cycle time, the set flow rate of the flow regulator 28 should be made smaller if this time is long while it should be made greater if the cycle time is short.

Given that the maximum amount of load in the PSA process is 100%, the cycle time at the time of reduced operation under 20% load would become 5 times greater, so that the set flow rate of the flow regulator 28 would be 1/5. Since the opening of the flow regulator 28 gradually increases with an increase in pressure in the adsorbent bed D which should be increased, this in combination of alteration of the set flow rate by controlling the load requires an operation in a wide uncontrollable range.

Accordingly, the pressurization may not be completed within the cycle time or may be completed too early. In the former case, raw gas rapidly flows in the adsorbent bed which has not completed the pressurization at the time of bed switching, causing a pressure drop to thereby reduce the amount of product gas sent. In the latter case, however, due to earlier completion of the pressurization, there may be a period of time until the next switching in which no product gas flows through the flow regulator 28, and during which time the pressure and feeding amount of product gas would increase.

It is therefore an object of the present invention to provide, in a PSA process for separating product gas as hydrogen and/or helium, an adsorptive separation process which can improve the recovery rate of product gas and can further reduce a variation in pressure and flow rate of product gas.

DISCLOSURE OF THE INVENTION

According to one aspect of the present invention, there is provided an adsorptive separation process for separating hydrogen and/or helium as product by a pressure swing adsorption process, characterized in that four or more adsorbent beds have a raw gas inlet end and a product gas discharge end and have an interior filled with an adsorbent; and that the process sequentially executes:

(a) an adsorption step for permitting raw gas to flow in the first adsorbent bed from the inlet end thereof under a constant highest pressure, causing the adsorbent to hold an easy adsorptive component, extracting an unadsorbed component as product gas from the product gas discharge end and completing flow of the raw gas when an adsorption front is at a middle of the first adsorbent bed;

(b) an equal depressurization step for discharging part of gas in the first adsorbent bed under the highest pressure from the product gas discharge end of the first adsorbent bed in a direction cocurrent to flow of the raw gas, and permitting the discharged gas to flow through the product gas discharge end of the second adsorbent bed which has been purified so as to eliminate an easy adsorptive component and is under a lowest pressure or low pressure set in advance by pressure equalization under lower pressure, thereby executing pressure equalization to cause the first and second adsorbent beds to have intermediate pressure;

(c) a cocurrent depressurization step for further discharging gas in the first adsorbent bed, which substantially consists of an unadsorbed component, from the product gas discharge end of the first adsorbent bed in a direction cocurrent to flow of the raw gas, further throttling pressure of the discharged gas to a lowest pressure for depressurization, permitting the cocurrent depressurized gas to flow through the product gas discharge end of the third adsorbent bed holding an easy adsorptive component and continuing the discharging until pressure of the first adsorbent bed becomes lower intermediate pressure lower than the intermediate pressure and when the easy adsorptive component of the third adsorbent bed is purged or is at least partially removed;

(d) a countercurrent depressurization step for discharging gas present in the first adsorbent bed under the lower intermediate pressure or gas present under the low pressure formed by pressure equalization executed with respect to the third adsorbent bed already purged to be under the lowest pressure, from the raw gas inlet end in a direction countercurrent to flow of the raw gas to thereby countercurrently desorb the easy adsorptive component held by the adsorbent of the first adsorbent bed, and continuing the discharging until the first adsorbent bed has the lowest pressure;

(e) a purging step for throttling cocurrent depressurized gas from the fourth adsorbent bed to have the lowest pressure, introducing the gas to the product gas discharge end of the first adsorbent bed and permitting the gas to flow within the first adsorbent bed in a direction countercurrent to flow of the raw gas to thereby desorb at least part of the easy adsorptive component held by the adsorbent of the first adsorbent bed, and discharging the at least part of the easy adsorptive component in accompaniment with the cocurrent depressurized gas from the fourth adsorbent bed from the raw gas inlet end of the first adsorbent bed for purgation;

(f) an equal pressurization step for introducing gas present under the highest pressure in the second adsorbent bed which has undergone the adsorption step, to the product gas discharge end of the first adsorbent bed purged to be under the lowest pressure immediately or after pressure is increased to low pressure by pressure equalization executed with respect to the fourth adsorbent bed which have already undergone cocurrent depressurization to be under the lower intermediate pressure, and increasing pressure of the first adsorbent bed until the first and second adsorbent beds are equalized to have the intermediate pressure;

(g) a product pressurization step for introducing part of product gas under the highest pressure flowing from the third adsorbent bed or another adsorbent bed to the product gas discharge end of the first adsorbent bed during or upon completion of the equal pressurization step to thereby increase pressure of the first adsorbent bed to higher intermediate pressure greater than the intermediate pressure but lower than the highest pressure; and (h) a raw gas pressurization step for introducing the raw gas to the raw gas inlet end of the first adsorbent bed whose pressure has been increased to the higher intermediate pressure, to thereby increase pressure of the first adsorbent bed to the highest pressure, while the third adsorbent bed or another adsorbent bed is executing the adsorption step; so that the raw gas is permitted to flow in the repressurized first adsorbent bed, and after returning to the adsorption step to extract hydrogen and/or helium as product gas from the discharge end by pressure substantially equal to that of raw gas, the individual steps are thereafter continuously repeated, and a process of the individual steps is sequentially executed for the second adsorbent bed, third adsorbent bed and fourth adsorbent bed, and other adsorbent beds if there are more adsorbent beds.

The second aspect of the present invention is characterized in that a time for pressure equalization in the equal depressurization step (b) in the first aspect is within one minute.

The third aspect of the present invention is characterized in that the relation between the higher intermediate pressure $P_1$ ata upon completion of pressurization by the product gas in the product pressurization step (g) in the first aspect and the highest pressure $P_2$ ata upon completion of pressurization by the raw gas in the raw gas pressurization step (h) satisfies:

$$0.1 < P_2 - P_1 < 2.0.$$

The fourth aspect of the present invention is characterized in that check valves are provided between the product gas discharge ends of the adsorbent beds and product gas feed manifolds to prevent reverse flow of the product gas to the adsorbent beds.

In other words, executing the individual steps according to the time schedule shown in FIG. 1 using the pressure swing adsorption apparatus arranged nearly as shown in FIG. 3 can eliminate the need to discharge and scrap precious product gas and provide a large buffer tank, thus improving cost performance as well as improve the recovery rate.

As described above, according to the adsorptive separation process of the present invention, a pressurization step by product gas and a pressurization step by raw gas are performed as a process for increasing pressure of the adsorbent bed before adsorption, thus ensuring control of the flow rate of the product gas at a constant level even at the end of pressurization by the product gas, and two adsorbent beds are used in parallel at the end of the raw gas pressurization, thus ensuring reduction of a change in flow rate at the time the adsorbent beds are switched and suppressing a change in pressure and flow rate of the product gas.

Conventionally, even during the equal pressurization step, the product gas pressurization should be executed as a measure against a change in flow rate at the same time. This causes an equal depressurization bed to have undesirably high remaining pressure, increasing the amount of product gas components discharged outside in the subsequent cocurrent depressurization and countercurrent depressurization steps. According to the present invention, however, since the raw gas pressurization step serves to suppress an increase in pressure of the product gas feed manifold, it is possible to stop the product gas pressurization during the equal pressurization step, thus improving the recovery rate of the product gas.

BRIEF DESCRIPTION OF THE DRAWINGS

FIG. 4 shows a time schedule illustrating a conventional example.

BEST MODE OF CARRYING OUT THE INVENTION

Figure 1:
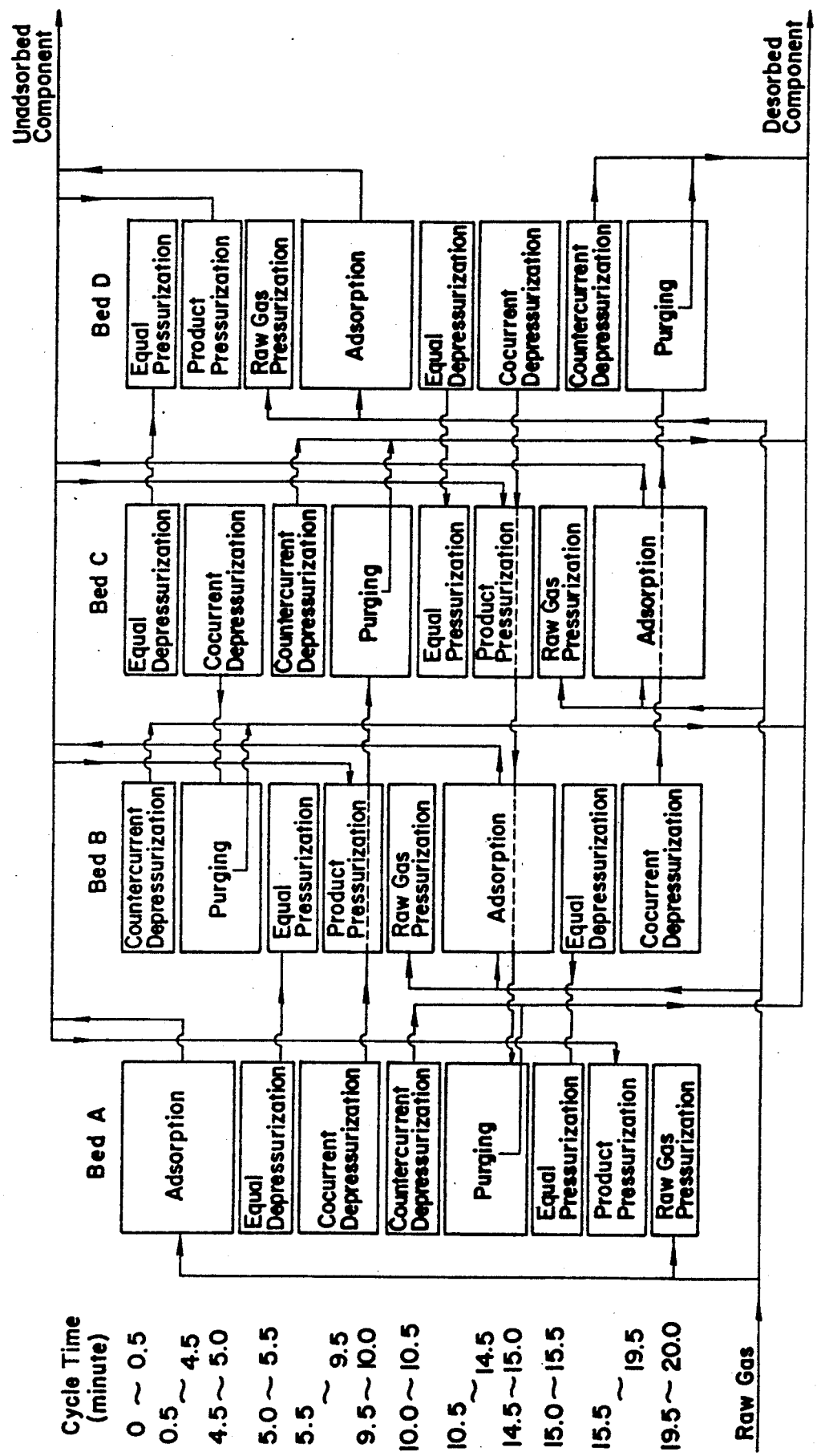
FIG. 1 illustrates a time schedule for the adsorptive separation process of the present invention.
Figure 3:
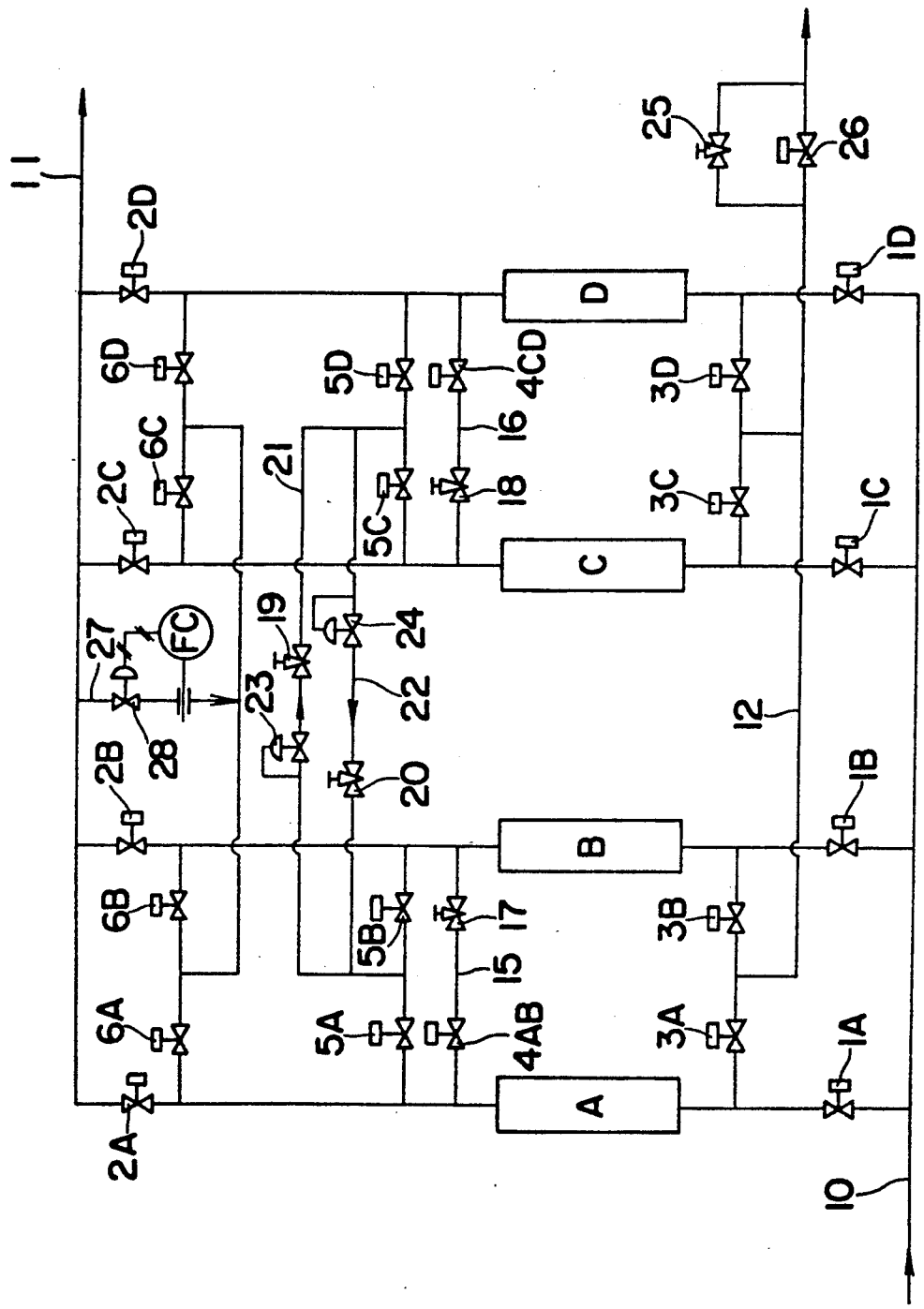
FIG. 3 is a flow sheet for an ordinary pressure swing adsorption apparatus.

The manipulation of the individual steps of the present invention will be described below based on the time schedule as shown in FIG. 1. A pressure swing adsorption apparatus as shown in FIG. 3 is used, and with the adsorption pressure, i.e., the highest pressure being indicated as 16 ata, pressure changes in the individual steps are illustrated.

When the adsorbent bed A is in the adsorption step, the automatic valves 1A and 2A are opened to introduce the raw gas of 16 ata (highest pressure) to the adsorbent bed A from the raw gas feed manifold 10. As the raw gas passes through the adsorbent bed A, easy adsorptive component gas is adsorbed by an adsorbent to thereby gradually increase the concentration of the product gas and high purity product gas is attained at the product gas discharge end of the bed A. This high purity product gas reaches the product gas feed manifold 11 from the automatic valve 2A and is fed to a demander. This state continues for 5 minutes.

At this time, the first 0.5 minute of the adsorbent bed B is for the countercurrent depressurization step where the automatic valve 3B is opened so that gas existing under pressure of 4.5 ata (lower intermediate pressure) in the bed is discharged through the throttle valve 25 to decrease the pressure in the bed to 1.1 ata (lowest pressure). In this countercurrent depressurization step, part of easy adsorptive component gas adsorbed in the adsorbent bed B is desorbed and discharged. Upon elapse of 0.5 minute, the automatic valves 5B, 5C are opened, and after equal depressurization, gas existing at 8 ata (intermediate pressure) in the adsorbent bed C is expanded to 1.1 ata (lowest pressure) through the flow regulator 24 and the throttle valve 20. This gas then flows through the adsorbent bed B, accompanied with further desorbed easy adsorptive component gas adsorbed by the adsorbent in the adsorbent bed B, and is discharged out from the system through the automatic valve 3B and newly-opened automatic valve 26. During this period, the adsorbent bed B is in the purging step and the adsorbent bed C is in the cocurrent depressurization step. This status continues for 4.5 minutes until the adsorption step of the adsorbent bed A is finished.

The adsorbent bed C is in the equal depressurization step for the first 0.5 minute, and the pressure in the bed which has been 16 ata (highest pressure) at the end of the adsorption step is equalized with the pressure of 1.1 ata (lowest pressure) in the adsorbent bed D so that both become 8 ata (intermediate pressure). This equalization is carried out by opening the automatic valve 4CD to permit the unadsorbed component gas, whose flow rate has been controlled to the proper value by the throttle valve 18, to flow from the adsorbent bed C to the adsorbent bed D. For the subsequent 4.5 minutes., the aforementioned cocurrent depressurization step is performed, and the automatic valve 4CD is closed and the automatic valve 5C is opened, thus permitting the unadsorbed component gas to flow from the adsorbent bed C to the adsorbent bed B.

The adsorbent bed D, for the first 0.5 minute, is in the equal pressurization step where its pressure is equalized with that of the adsorbent bed C as described earlier and no product gas will flow in. Upon elapse of 0.5 minute, the equalization is completed and the automatic valve 4CD is closed while the automatic valve 6D is opened. Then, the process advances to the product gas pressurization step where the product gas from the product gas feed manifold 11, after passing through the flow regulator 28, is set to have a predetermined flow rate and flows in the adsorbent bed D, thus increasing the pressure in the bed D to a level higher than 8 ata (intermediate pressure). The flow regulator 28 is set to increase the pressure in the adsorbent bed D from 8 ata (intermediate pressure) to 15 ata (higher intermediate pressure) in 4 minutes. When this time elapses, the automatic valve 6D is closed and the automatic valve 1D is opened at the same time, so the process enters the raw gas pressurization step where the raw gas is introduced from the raw gas feed manifold 10 to increase the pressure in the adsorbent bed D from 15 ata (higher intermediate pressure) to 16 ata (highest pressure). Subsequently, the automatic valve 2D is opened and, though a very short period of time, the bed D is in the adsorption step in parallel with the adsorbent bed A. This sequence of operations is complete in 0.5 minute.

The above describes an example of manipulation of the basic cycle over 5 minutes. After the adsorbent bed A finishes the adsorption step, the adsorbent bed D enters the adsorption step, and the steps of the individual adsorbent beds are sequentially switched as indicated in the time schedule shown in FIG. 1; after 4 cycles (20 minutes), the entire steps of the individual adsorbent beds are completed and then the above individual steps are repeated.

In other words, each adsorbent bed performs the adsorption step for 5.0 minutes, the equal depressurization step for 0.5 minute, the cocurrent depressurization step for 4.5 minutes., the countercurrent depressurization step for 0.5 minute, the purging step for 4.5 minutes., the equal pressurization step for 0.5 minute, the product pressurization step for 4.0 minutes and the raw gas pressurization step for 0.5 minute, and the above as one cycle is repeated and the process returns to the adsorption step.

The pressure of the adsorbent bed at this time is 16 ata in the adsorption step, is changed from 16 ata to 8 ata in the equal depressurization step, from 8 ata to 4.5 ata in the cocurrent depressurization step, and from 4.5 ata to 1.1 ata in the countercurrent depressurization step, is 1.1 ata in the purging step, and is changed from 1.1 ata to 8 ata in the equal pressurization step, from 8 ata to 15 ata in the product pressurization step and from 15 ata to 16 ata in the raw gas pressurization step.

According to the present invention, therefore, the increasing the pressure of the adsorbent bed to the highest pressure prior to the adsorption step is separated into the product pressurization and the raw gas pressurization. In other words, the product pressurization is stopped at a predetermined pressure and the final pressurization is executed by the raw gas. Since there is a pressure difference between the product gas feed manifold and the adsorbent bed even at the end of pressurization initiated by the product gas, therefore, the pressurized flow rate can be controlled at a constant level.

When the pressurization initiated by the product gas starts, the raw gas is branched to two directions so that the pressure of the raw gas slightly tends to decrease. This can cancel out the tendency of the pressure in the product gas feed manifold to increase by stopping the pressurization of the product gas, thus eliminating a variation in pressure of the product gas. Further, since two adsorbent beds are used in parallel at the end of the pressurization by the raw gas, it is possible to suppress a variation in flow rate of the product gas at the time the adsorbent beds are switched.

According to the conventional process, even during the equal pressurization step, the product gas pressurization should be executed as a measure against a change in flow rate at the same time. This is necessary to keep the flow rate and pressure of the product gas constant, but causes an equal depressurization bed to keep undesirably high remaining pressure or a significant amount of gas inside, thus increasing the amount of product gas components discharged outside in the subsequent cocurrent depressurization and countercurrent depressurization steps. According to the present invention, as described above, since the raw gas pressurization step serves to suppress an increase in pressure of the product gas feed manifold, it is possible to stop the product gas pressurization during the equal pressurization step, thus improving the recovery rate of the product gas.

In the description of the time schedule, the equal pressurization step and product pressurization step of the adsorbent bed D are separated, i.e., the automatic valve 4CD is closed while the automatic valve 6D is opened upon completion of the equal pressurization. If the automatic valve 6D is opened immediately before the automatic valve 4CD is closed, however, a variation in flow rate and pressure of the product gas can be further reduced. With the time for this pressure equalization being 0.5 minute or 30 seconds as described earlier, in consideration of a slight time required for opening and closing the automatic valves, it is practical to create such a state where both of the automatic valves 4CD and 6D are opened for a very short period of time; for example, upon elapse of 20 seconds, opening the automatic valve 6D starts and the automatic valve 4CD is closed 10 seconds later. Since the flow of the product gas from the product gas feed manifold to the adsorbent bed is stopped during this equal pressurization (pressure equalization), it is not desirable to keep this state for a long time and this time should be within 1 minute.

In the raw gas pressurization step, it is desirable that the relation between the higher intermediate pressure $P_1$ ata at the end of the product pressurization and the highest pressure $P_2$ ata at the end of the pressurization by the raw gas satisfies $0.1 < P_2 - P_1 < 2.0$. With this pressure difference being large, when the process advances to the raw gas pressurization step from the product pressurization step, the raw gas would rapidly flow in the adsorbent bed which undergoes raw gas pressurization, so that the pressure in the raw gas feed manifold falls. This may drop the pressure in the adsorbent bed which is undergoing the adsorption step, i.e., the pressure of the product gas from this adsorbent bed.

Figure 2A:
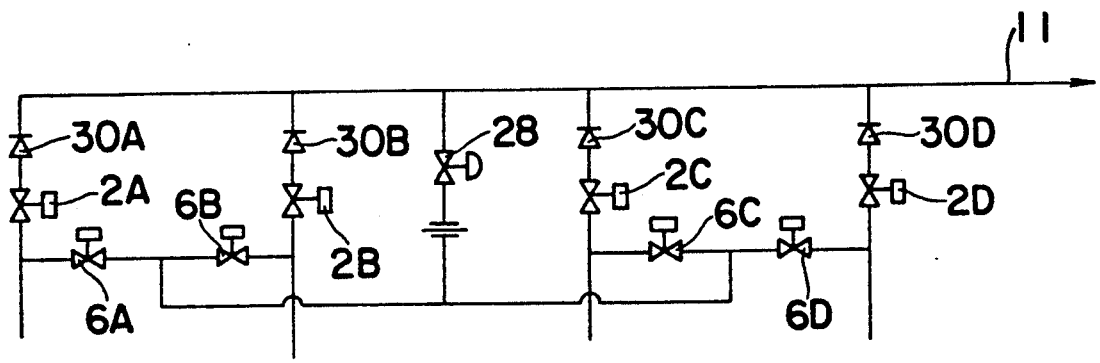
FIG. 2 is a flow sheet illustrating an improved section to effectively carry out the present invention.
Figure 2B:
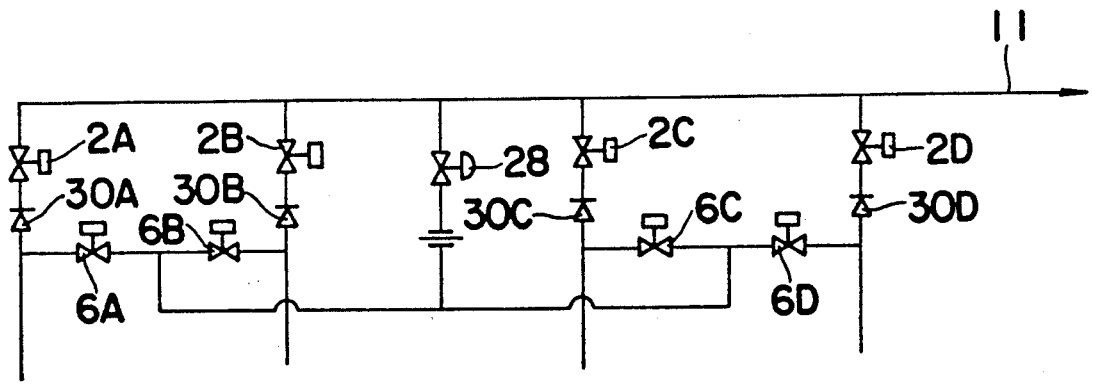

In addition, with regard to the raw gas pressurization step, it has been described that the automatic valve 1D is opened first to introduce the raw gas into the adsorbent bed D and the automatic valve 2D is opened when the pressure inside the bed reaches 16 ata, before entering the adsorption step. If check valves 30A, 30B, 30C and 30D are mounted on the inlet or outlet sides of the respective automatic valves 2A, 2B, 2C and 2D as shown in FIG. 2(a) or 2(b), however, it is possible to prevent the reverse flow of the product gas from the product gas feed manifold 11 to the adsorbent bed, so that the automatic valves 1D and 2D can be simultaneously opened before the adsorbent bed D enters the raw gas pressurization step. This can eliminate the need to manipulate the automatic valve 2D when the pressure in the adsorbent bed D reaches 16 ata and can therefore omit some procedure.

The following illustrates the present invention in comparison with the conventional example.

EXAMPLE 1

Hydrogen was refined under the conditions below according to the time schedule shown in FIG. 1 using the pressure swing adsorption apparatus shown by the flow sheet of FIG. 3.

| Composition Of Raw Gas (mol %): | |
|---|---|
| Hydrogen ($H_2$) | 77.1 |
| Methane ($CH_4$) | 0.01 |
| Carbon Monoxide (CO) | 0.35 |
| Carbon Dioxide ($CO_2$) | 22.5 |
| Composition Of Product Gas (mol %): | |
| Hydrogen ($H_2$) | 99.9999 |
| Dry (Dew Point - Below 70° C.) | |

Adsorbent

Activated Charcoal In Use With Calcium Zeolite
Adsorbent Pressure: 16 ata

EXAMPLE 2

Hydrogen was refined under the same conditions, with the check valves shown in FIG. 2(a) or 2(b) additionally provided in and an improvement of the valve manipulation in the equal pressurization step further made in EXAMPLE 1.

COMPARISON

Hydrogen was refined using the raw gases in the same conditions as in EXAMPLE 1 according to the time schedule shown in FIG. 4 referred to for the conventional example.

The results are illustrated in the following table.

| | EXAMPLE 1 | EXAMPLE 2 | COMPARISON |
|---|---|---|---|
| Flow Rate of Raw Gas ($Nm^3$/h) | 24.0 | 24.3 | 25.9 |
| Final Pressure in Each Step ($Kg/cm^2$abs) | | | |
| Raw Gas Pressurization | 16 | 16 | None |
| Product Pressurization | 15 | 15 | 16 |
| Equal Pressurization, Equal Depressurization | 8 | 8.1 | 9 |
| Cocurrent Depressurization | 4.5 | 4.6 | 5 |
| Countercurrent Depressurization, Purging | 1.1 | 1.1 | 1.1 |
| Product Hydrogen Gas | | | |

-continued

| | EXAMPLE 1 | EXAMPLE 2 | COMPARISON |
|---|---|---|---|
| Flow Rate ($Nm^3$/h) | 15 | 15 | 15 |
| Variation in Above | 5% | 3% | 8% |
| Purity | 99.9999% | 99.9999% | 99.9999% |
| Recovery Rate | 81% | 80.4% | 75% |

It should be clear from the results that carrying out the steps of the present invention can reduce a variation in flow rate of the product hydrogen gas as well as improve the recovery rate thereof.

Industrial Applicability

The adsorptive separation process of the present invention can be used in a variety of application fields, such as production of hydrogen from steam reforming gas, such as butane, naphtha or methanol, production of hydrogen from coal-based generated gas, such as COG, recovery of hydrogen from gas produced by oil refining, and recovery of helium from natural gas.

We claim:

1. An adsorptive separation process for separating hydrogen and/or helium as product by a pressure swing adsorption process, characterized in that four or more adsorbent beds have a raw gas inlet end and a product gas discharge end and have an interior filled with an adsorbent; and that said process sequentially executes:

(a) an adsorption step for permitting raw gas to flow in the first adsorbent bed from said inlet end thereof under a constant highest pressure, causing said adsorbent to hold an easy adsorptive component, extracting an unadsorbed component as product gas from said product gas discharge end and completing flow of said raw gas when an adsorption front is at a middle of said first adsorbent bed;

(b) an equal depressurization step for discharging part of gas in said first adsorbent bed under said highest pressure from said product gas discharge end of said first adsorbent bed in a direction cocurrent to flow of said raw gas, and permitting said discharged gas to flow through said product gas discharge end of the second adsorbent bed which has been purified so as to eliminate an easy adsorptive component and is under a lowest pressure or low pressure set in advance by pressure equalization to cause said first and second adsorbent beds to have intermediate pressure;

(c) a cocurrent depressurization step for further discharging gas in said first adsorbent bed, which substantially consists of an unadsorbed component, from said product gas discharge end of said first adsorbent bed in a direction cocurrent to flow of said raw gas, further throttling pressure of said discharged gas to a lowest pressure for depressurization, permitting said cocurrent depressurized gas to flow through said product gas discharge end of the third adsorbent bed holding an easy adsorptive component and continuing said discharging until pressure of said first adsorbent bed becomes lower intermediate pressure lower than said intermediate pressure and when said easy adsorptive component of said third adsorbent bed is purged or is at least partially removed;

(d) a countercurrent depressurization step for discharging gas present in said first adsorbent bed under said low pressure formed by pressure equalization executed with respect to said third adsorbent bed already purged to be under said lowest pressure, from said raw gas inlet end in a direction countercurrent to flow of said raw gas to thereby countercurrently desorb said easy adsorptive component held by said adsorbent of said first adsorbent bed, and continuing said discharging until said first adsorbent bed has said lowest pressure;

(e) a purging step for throttling cocurrent depressurized gas from the fourth adsorbent bed to have said lowest pressure, introducing said gas to said product gas discharge end of said first adsorbent bed and permitting said gas to flow within said first adsorbent bed in a direction countercurrent to flow of said raw gas to thereby desorb at least part of said easy adsorptive component held by said adsorbent of said first adsorbent bed, and discharging said at least part of said easy adsorptive component in accompaniment with said cocurrent depressurized gas from said fourth adsorbent bed from said raw gas inlet end of said first adsorbent bed for purgation;

(f) an equal pressurization step for introducing gas present under said highest pressure in said second adsorbent bed which has undergone said adsorption step, to said product gas discharge end of said first adsorbent bed purged to be under said lowest pressure immediately or after pressure is increased to low pressure by pressure equalization executed with respect to said fourth adsorbent bed which have already undergone cocurrent depressurization to be under said lower intermediate pressure, and increasing pressure of said first adsorbent bed until said first and second adsorbent beds are equalized to have said intermediate pressure;

(g) a product pressurization step for introducing part of product gas under said highest pressure flowing from said third adsorbent bed or another adsorbent bed to said product gas discharge end of said first adsorbent bed during or upon completion of said equal pressurization step to thereby increase pressure of said first adsorbent bed to higher intermediate pressure greater than said intermediate pressure but lower than said highest pressure; and (h) a raw gas pressurization step for introducing said raw gas to said raw gas inlet end of said first adsorbent bed whose pressure has been increased to said higher intermediate pressure, to thereby increase pressure of said first adsorbent bed to said highest pressure, while said third adsorbent bed or another adsorbent bed is executing said adsorption step;

so that said raw gas is permitted to flow in said repressurized first adsorbent bed, and after returning to said adsorption step to extract hydrogen and/or helium as product gas from said discharge end, by pressure substantially equal to that of raw gas, and the variation of product gas flow rate is within a range of ±5%, said individual steps are thereafter continuously repeated, and a process of said individual steps is sequentially executed for said second adsorbent bed, third adsorbent bed and fourth adsorbent bed, and other adsorbent beds if there are more adsorbent beds.

2. An adsorptive separation process according to claim 1, characterized in that a time for pressure equalization in said equal depressurization step (b) is within one minute.

3. An adsorptive separation process according to claim 1, characterized in that the relation between said higher intermediate pressure $P_1$ ata upon completion of pressurization by said product gas in said product pressurization step (g) and said highest pressure $P_2$ ata upon completion of pressurization by said raw gas in said raw gas pressurization step (h) satisfies:

$$0.1 < P_2 - P_1 < 2.0.$$

4. An adsorptive separation process according to claim 1, characterized in that check valves are provided between said product gas discharge ends of said adsorbent beds and product gas feed manifolds to prevent reverse flow of said product gas to said adsorbent beds.

* * * * *